(12) United States Patent
    Zhang et al.

(10) Patent No.: US 12,655,314 B2

(45) Date of Patent: Jun. 16, 2026

(54) LOW VOC COATINGS INCLUDING HYPER-BRANCHED ALKYLATED POLYMERS

(71) Applicant: SWIMC LLC, Cleveland, OH (US)

(72) Inventors: Dun Zhang, Moreland Hills, OH (US); Zhiwei Xie, Calabasas, CA (US); Matthew H. Striewing, Richfield, OH (US); Frank F. Markovitz, II, Westlake, OH (US)

(73) Assignee: SWIMC LLC, Cleveland, OH (US)

( * ) Notice: Subject to any disclaimer, the term of this patent is extended or adjusted under 35 U.S.C. 154(b) by 962 days.

(21) Appl. No.: 17/777,107

(22) PCT Filed: Nov. 25, 2020

(86) PCT No.: PCT/US2020/062173
    § 371 (c)(1),
    (2) Date: May 16, 2022

(87) PCT Pub. No.: WO2021/108507
    PCT Pub. Date: Jun. 3, 2021

(65) Prior Publication Data
    US 2022/0403201 A1     Dec. 22, 2022

Related U.S. Application Data

(60) Provisional application No. 62/941,007, filed on Nov. 27, 2019.

(51) Int. Cl.
    | | |
    |---|---|
    | *C09D 15/00* | (2006.01) |
    | *C08G 83/00* | (2006.01) |
    | *C09D 5/14* | (2006.01) |
    | *C09D 7/20* | (2018.01) |
    | *C09D 7/46* | (2018.01) |
    | *C09D 201/06* | (2006.01) |

(52) U.S. Cl.
    CPC ........... *C09D 15/00* (2013.01); *C08G 83/006* (2013.01); *C09D 5/14* (2013.01); *C09D 7/20* (2018.01); *C09D 7/46* (2018.01); *C09D 201/06* (2013.01)

(58) Field of Classification Search
    CPC .... C09D 201/005; C09D 167/08; C09D 5/14; C09D 5/32; C09D 7/20; C09D 7/46; C09D 7/61; C08G 83/006
    See application file for complete search history.

(56) References Cited

U.S. PATENT DOCUMENTS

| | | | |
|---|---|---|---|
| 4,276,329 A | 6/1981 | Vasishth et al. | |
| 5,912,299 A | 6/1999 | Tomko et al. | |
| 6,187,387 B1 * | 2/2001 | Bolle | B27K 3/153 |
| | | | 427/393 |
| 2007/0142520 A1 * | 6/2007 | Pogue | C09D 15/00 |
| | | | 524/313 |
| 2010/0267886 A1 | 10/2010 | Roller et al. | |
| 2011/0263789 A1 | 10/2011 | Taniguchi et al. | |
| 2014/0073735 A1 | 3/2014 | Schrinner et al. | |
| 2018/0094157 A1 * | 4/2018 | Halstead | C09D 5/027 |

FOREIGN PATENT DOCUMENTS

| | | |
|---|---|---|
| EP | 0314378 A1 | 5/1989 |
| WO | 2004037881 A1 | 5/2004 |
| WO | 2011109151 A1 | 9/2011 |
| WO | 2013181481 A1 | 12/2013 |

OTHER PUBLICATIONS

Murillo, "Synthesis and characterization of hyperbranched alkyd resins based on tall oil fatty acids", Progress in Organic Coatings, 69, 235-240, 2010. (Year: 2010).*

Hassanian, et al., "Kinematic Viscosity of Linseed Oil, Almond Oil and Diesel Fuel", Advances in Environmental Biology, 8(12), pp. 147-151, Jul. 2014. (Year: 2014).*

Price, et al., "Linseed oil yield and Iodine Values—Refractive Index correlation for Queensland-Grown Linseed", Queensland Journal of Agricultural and Animal Sciences, vol. 24, Bulletin No. 417, pp. 279-285, 1967. (Year: 1967).*

International Search Report & Written Opinion for PCT/US2020/062173 dated Mar. 23, 2021, 13 pages.

Sorensen, K. "Routes to VOC-compliant alkyd coatings" Surface Coatings International, Issue 2008/6, 2008, p. 312-318.

Shaik, et al. "Synthesis and characterization of castor oil-based branched polyols from renewable resources and their polyurethane-ureA coatings", J. Coat. Technol. Res., 16 (2) 387-400, 2019, 14 pages.

Murillo et al. "Colloidal, morphological, thermal, rheological, and film properties of waterborne hyperbranched alkyd-acrylic resins" J. Coat. Technol. Res., 16 (5) 1223-1232, 2019, 10 pages.

Wang, et al. "Making alkyd greener: Modified cardanol as bio-based reactive diluents for alkyd coating" Progress in Organic Coatings, vol. 135, Oct. 2019, pp. 281-290.

* cited by examiner

*Primary Examiner* — Christopher M Rodd

(57) ABSTRACT

A low volatile organic compound (VOC) coating composition with a low viscosity is described. The coating composition includes a hydrocarbon solvent; a reactive or non-reactive diluent; a drier composition; and a hyper-branched alkylated polymer. A colorant can be added so that the coating composition can be used as a stain, such as a wood stain. The hyper-branched alkylated polymer functions as the main binder to provide an effective coating composition having a relatively low VOC level.

28 Claims, No Drawings

LOW VOC COATINGS INCLUDING HYPER-BRANCHED ALKYLATED POLYMERS

CROSS REFERENCE TO RELATED APPLICATION

This application is the National Stage filing under 35 U.S.C. 371 of International Application No. PCT/US2020/062173 filed on Nov. 25, 2020, which itself claims priority to U.S. Prov. Appln. No. 62/941,007, filed on Nov. 27, 2019, the entirety of which are hereby incorporated by reference.

FIELD OF INVENTION

This disclosure relates to stains and finishes that have a low amount of volatile organic compounds. Specifically, this disclosure relates to stains and finishes that include hyper-branched alkylated polymers that are also low in volatile organic compounds.

BACKGROUND

Stains and finishes for wood were initially based on drying oils, such as linseed and or Tung oil. These materials are unsaturated fatty acids that crosslink by an auto-oxidation reaction. The ease of application and desired appearance of the final product make them well suited for treating wood surfaces. These oils can be used in a pure form, formulated with siccatives, in the case of boiled linseed oil, or undergo additional formulation. These oil-based finishes are by nature high solids, low in volatile organic compounds (VOC), and have low viscosities. However, these oil-based finishes dry very slowly and lack robust performance properties. For these reasons, alkyd resins were developed.

Alkyd resins are generally made by esterifying a polyol with fatty acids and can undergo additional reactions to create further modification and higher molecular weights. Alkyd resins allow for faster dry times and more robust performance compared to oil finishes. However, the higher molecular weight of the alkyd resins necessitates the resin to be dissolved in solvent to create a solution with a viscosity appropriate for the intended end use application. The amount of solvent needed can be substantial, and the result is a high VOC coating formulation. Therefore, a material is needed that provides the dry times and physical properties of alkyd resins, and at the same time have an application viscosity and low VOC of a traditional oil finish.

Alkylated resins are useful as coating binders since they are inexpensive, provide good adhesion, gloss retention, water repellency, good penetration, long open times, erosion mode, and low minimum film forming temperatures.

A major source of man-made volatile organic compounds (VOC)s are coatings, especially paints and protective coatings. Solvents are required to spread a protective or decorative film. Approximately 12 billion liters of paints are produced annually. Typical solvents are aliphatic hydrocarbons, ethyl acetate, glycol ethers, and acetone. Stains including alkylated resins also include high amounts of VOCs.

With the advent of environmental laws and regulations controlling the maximum amounts of VOC permitted in paints, coatings, stains, sealants and the like, numerous attempts have been made in the prior art to formulate coatings and stains which comply with the VOC requirements. In particular, various water-borne low VOC formulae have been developed.

For example, European Patent Application 0314378A1 to Adkins discloses a waterborne alkyd deck stain containing a medium-long oil length water-reducible alkyd resin solubilized in water with the use of propylene glycol tertiary butyl ether as a coupling solvent. Likewise, U.S. Pat. No. 4,276,329 to Vasishth et al. discloses a composition for treating and protecting wood surfaces comprising a low molecular weight alkyd resin in a co-solvent of water and glycol ether. U.S. Pat. No. 5,912,299 to Tomko et al. describes an oil-modified polyurethane-urea dispersion in water including a modifier composition that is chemically attached to the prepolymer via diamine chain extension. Introduction of long hydrophobic end groups provided improved water resistance and beading characteristics, even when a low molecular weight dispersion polymer was used.

Unfortunately, water-borne low VOC formulae exhibit a number of undesirable properties such as fast drying, poor penetration, lap lines, wood grain raise, and poor durability. As a result, there remains a need for coating compositions such as wood stains that provide an effective coating without requiring the use of amounts of VOCs that are typical for traditional solvent-based coating compositions.

SUMMARY

Coating compositions including hyper-branched polymers are provided. It has been discovered that these coatings are more effective than traditional linear binders in that they have lower viscosity and many more functional groups for the equivalent molecular weight. By using hyper-branched polymers as the main binder for a coating composition such as a wood stain, a composition that provides lower batch viscosity (i.e. less than about 1500 cps), fewer lap lines, good surface (e.g., wood) penetration, and effective coating of a surface at a relatively lower VOC level.

In one embodiment, hyper-branched alkylated polymers were synthesized by reacting, for example, one or more fatty acids with a hyper-branched polyol core. The hyper-branched alkylated polymer may then undergo additional chain extensions or other post formation modifications resulting in higher molecular weight polymers or polymers with varying levels of unsaturation of the fatty acid components. The resulting polymers are used to formulate coating compositions (e.g., wood stains) that required minimal use of solvents, thereby providing a coating composition having a lower VOC level. Reactive and non-reactive oils, or diluents, can be added to fill in volume and provide the desired levels of penetration, cross-linking, and the viscosity of the formulas.

In one aspect, the present invention provides a low VOC coating composition. The composition includes a hydrocarbon solvent; a drier composition; a hyper-branched alkylated polymer, and optionally, a reactive and/or non-reactive diluent, and/or an anti-skinning composition, a drier accelerator, and/or a dispersed colorant. In some embodiments, the composition includes <150 g/L of VOCs. In further embodiments, wherein the coating composition is a wood stain.

In further embodiments, 25% to 95% by weight of the composition comprises the hyper-branched alkylated polymer. In yet further embodiments, 5 to 15% by weight of the composition comprises the hydrocarbon solvent. The hydrocarbon solvent can include mineral spirits or other aromatic solvents. In additional embodiments, 0 to 25% by weight of the composition may comprise a reactive or non-reactive diluents.

The reactive diluents can include linseed oil and/or Tung oil, their derivatives, or other low viscosity materials that participate in oxidative curing. Non-reactive diluents may include mineral oils, cutting board oils, or non-drying oils such as coconut oil or hydrogenated oils. Non-reactive diluents can also include classes of hydrocarbon resins that do not oxidatively dry.

In additional embodiments, 0.1 to 3.5% by weight of the composition comprises the drier composition. The drier composition can include, for example, a calcium, zirconium, cobalt, iron-complex, or manganese drier, or combinations thereof.

In additional embodiments, 0.1 to 0.5% of the composition includes a drier accelerator. The drier accelerator can include Dri-Rx HF. In another embodiment 0.1 to 1.0% of the composition includes an anti-skinning composition. The anti-skinning composition may include methyl ethyl ketoxime (MEKO), N,N-Diethylhydroxylamine, 2-pentanone oxime, cyclohexanone oxime, or combinations thereof.

In additional embodiments, the composition further comprises a fungicide and a UV absorber. In some embodiments, the hyper-branched alkylated polymer is obtained by reacting one or more fatty acids, having a conjugated content of at least 11%, and in some embodiments at least 36%, with a hyper-branched polyol. The hyper-branched polyol can include a liquid hyper-branched polyester or ether polyol, or a blend thereof.

Another aspect of the invention provides a method for coating a surface. The method includes applying a low VOC coating composition to the surface and removing any excess of the coating composition from the surface, wherein the low VOC coating composition comprises a hydrocarbon solvent; a reactive or non-reactive diluent; a drier; an anti-skinning agent, and a hyper-branched alkylated polymer.

In some embodiments of the method, the coating composition is a wood stain, and the surface is a wood surface. In further embodiments, the coating composition further comprises a dispersed colorant. In additional embodiments, 25% to 95% by weight of the low VOC coating composition comprises hyper-branched alkylated polymer.

DETAILED DESCRIPTION

The present invention provides a low volatile organic compound (VOC) coating composition. The coating composition includes a hydrocarbon solvent; a reactive or non-reactive diluent; a drier composition; and a hyper-branched alkylated polymer. A colorant can be added so that the coating composition can be used as a stain, such as a wood stain. The hyper-branched alkylated polymer functions as the main binder to provide an effective coating composition having a relatively low VOC level.

Unless otherwise defined, all technical and scientific terms used herein have the same meaning as commonly understood by one of ordinary skill in the art to which this application pertains. Although methods and materials similar or equivalent to those described herein can be used in the practice or testing of the exemplary embodiments, suitable methods and materials are described below. In case of conflict, the present specification, including definitions, will control. In addition, the materials, methods, and examples are illustrative only and not intended to be limiting.

Definitions

The terminology as set forth herein is for description of the embodiments only and should not be construed as limiting the application as a whole. Unless otherwise specified, "a," "an," "the," and "at least one" are used interchangeably. Furthermore, as used in the description of the application and the appended claims, the singular forms "a", "an", and "the" are inclusive of their plural forms, unless contraindicated by the context surrounding such.

The recitations of numerical ranges by endpoints include all numbers subsumed within that range (e.g., 1 to 5 includes 1, 1.5, 2, 2.75, 3, 3.80, 4, 5, etc.).

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

The phrase "consisting essentially of" means that the composition or method may include additional ingredients and/or steps, but only if the additional ingredients and/or steps do not materially alter the basic and novel characteristics of the claimed composition or method.

As used herein, the term "organic group" is used to mean a hydrocarbon group that is classified as an aliphatic group, cyclic group, or combination of aliphatic and cyclic groups (e.g., alkaryl and aralkyl groups). An alkaryl group is a an aryl group that is attached to the remainder of the structure by an intervening alkyl group, whereas an aralkyl group is an aryl group that is attached directly to the structure but that includes one or more additional alkyl groups attached thereto. In the context of the present invention, suitable organic groups for the compounds of the invention are those that do not interfere with the desired activity of the compounds (e.g., their anticancer activity). In the context of the present invention, the term "aliphatic group" means a saturated or unsaturated linear or branched hydrocarbon group. This term is used to encompass alkyl, alkenyl, and alkynyl groups, for example.

As used herein, the terms "alkyl", "alkenyl", and the prefix "alk-" are inclusive of straight chain groups and branched chain groups. Unless otherwise specified, these groups contain from 1 to 20 carbon atoms, with alkenyl groups containing from 2 to 20 carbon atoms. In some embodiments, these groups have a total of at most 10 carbon atoms, at most 8 carbon atoms, at most 6 carbon atoms, or at most 4 carbon atoms. Alkyl groups including 4 or fewer carbon atoms can also be referred to as lower alkyl groups. Alkyl groups can also be referred to by the number of carbon atoms that they include (i.e., $C_1$-$C_4$ alkyl groups are alky groups including 1-4 carbon atoms).

Low VOC Coating Compositions

In one aspect, the present invention provides a low volatile organic compound (VOC) coating composition. The coating composition includes a hydrocarbon solvent; a reactive or non-reactive diluent; a drier composition; and a hyper-branched alkylated polymer. When a colorant is included or added to the coating, the coating composition can be used as a stain.

Volatile organic compounds are organic chemicals that have a high vapor pressure at ordinary room temperature. VOCs are legally defined in the various US laws and codes under which they are regulated. The EPA regulates VOCs in the air, water, and land. The EPA publishes wastewater testing methods for chemical compounds, including a range of VOCs, pursuant to the Clean Water Act. In addition to drinking water, VOCs are regulated in pollutant discharges to surface waters (both directly and via sewage treatment plants) and as hazardous waste. The Occupational Safety and Health Administration (OSHA) regulates VOC exposure in the workplace. Volatile organic compounds that are classified as hazardous materials are regulated by the Pipeline and Hazardous Materials Safety Administration while being transported.

Examples of compounds commonly classified as VOCs include acetone, acrolein, acrylonitrile, benzene, bromodichloromethane, bromoform, bromomethane carbon tetrachloride, chlorobenzene, chloroethane, chloroform, dibromochloromethane, dichloroethane, dichloropropane, dichloropropene, diethyl ether, dioxane, ethylbenzene, methyl chloride, methyl ethyl ketone, tetrachloroethane, formaldehyde, toluene, trichloroethane, styrene, and vinyl chloride.

The present invention provides coating compositions having a decreased amount of VOCs compared to comparable traditional coating compositions (e.g., stains). In some embodiments, the coating composition includes <300 g/L of VOCs, while in other embodiments the coating composition includes <250 g/L of VOCs, <200 g/L of VOCs, <150 g/L of VOCs, <100 g/L of VOCs, or <75 g/L VOCs.

In some embodiments, the coating composition does not include a colorant. The coating composition can be applied to a surface without a colorant, or a colorant can be added to the composition before the composition is applied to a surface. The term colorant, as used herein, refers to any material that can impart color to the composition, such as a dye or pigment. In some embodiments, the composition includes a dispersed colorant. A dispersed colorant is one that has been evenly distributed throughout the composition. Colorants are available in a wide variety of colors.

Light fast dyes can be used as colorants for the coating compositions of the present invention, and provide resistance to fading upon exposure to natural light. Amongst the light fast dyes, light fast metal complex dyes are particularly useful. Metal complex dyes may include 1:1 or 1:2 metal complexes of azo or azomethine dyes or metallized phthalocyanines, such as copper phthalocyanine or nickel phthalocyanine; as well as other 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes. Suitable metal complex dyes may include those that are available commercially under the designation Neozapon®. from BASF, Orasol® from Ciba-Geigy, or Savinyl® from Clariant Pigments & Additives.

In some embodiments of the present invention, the coating compositions further comprise one or more pigments. The pigments can also be dispersed within the coating composition. Organic pigments, inorganic pigments, and blends thereof may be used. Examples of organic pigments include anthraquinone pigments; quinophthalone pigments; isoindoline pigments; nitroso pigments; perinone pigments; quinacridone pigments; perylene pigments; pyrropyrrol pigments; and dioxazine pigments. Example of inorganic pigment include carbon pigments such as carbon black; chromate pigments; sulfide pigments; oxide pigments; hydroxide pigments; ferrocyanide pigments; silicate pigments; phosphate pigments; and other pigments (such as cadmium sulfide and cadmium selenide). Pigments are available in a wide variety of colors, including whites, such as titanium dioxide, zinc oxide, and zinc sulfide; reds, such as cadmium sulfide, selenite, and iron oxide; yellows, such as cadmium sulfide, lead chromate, and iron oxide; greens, such as chromium oxide green; blues, such as iron, ultramarine, and cobalt blues; and blacks, such as carbon black. Pigments may also include metallic flakes and natural and synthetic inert extender pigments, for example, kaolinite, mica, calcium carbonate, silica, barium sulfate, and talc.

As with the dyes, in some embodiments, the desired compositional color may be achieved with one pigment, while in other embodiments; mixtures of two or more kinds or colors of pigments may be employed. In some embodiments, blends of inert pigments and pigments for supplying color (referred to as colored pigments) may be used. It will be recognized that pigment dispersions comprising discrete pigment particles dispersed in a carrier solvent, with or without pigment dispersants, resins, and other conventional additives, may be used and are readily commercially available.

In some embodiments, the coating composition is a stain or a wood stain. A stain consists of colorants dissolved and/or suspended in a solvent. A stain is applied to a surface to impart color to the surface. Stains are typically transparent, but opaque stains can also be used. Stains also typically include less binder than a paint coating, and include a reactive or non-reactive diluent, both of which encourage penetration of the composition into the surface (e.g., wood grain). A wood stain is a stain that has a composition that makes it more suitable for use on wood, as opposed to other surfaces such as concrete, such as the ability to penetrate into wood grain and to protect the surface of the wood. In some embodiments, the stain includes a colorant that imparts a natural oak color, a maple color, a chestnut color, a dark mahogany color, or a walnut color to the surface on which it is applied. It should be appreciated that the colorant may include other suitable colors of pigment or dye, or a combination of pigment and dye.

The coating composition also include a hydrocarbon solvent, or blend of hydrocarbon solvents. A hydrocarbon solvent is one based on one or more hydrocarbons, and are also known as organic solvents. The hydrocarbon solvents may be aliphatic or aromatic solvents. In some embodiments, the hydrocarbon solvent blend includes at least one aliphatic solvent. Useful aliphatic solvents include hydrogenated petroleum distillates, such as pentane, hexane, cyclohexane, petroleum naptha, heptane, VM&P naptha, 90 solvent (i.e., an aliphatic solvent with a flash point of 90° F.), mineral spirits, low odor base solvent, 140 solvent (i.e., an aliphatic solvent with a flash point of 140° F.). Useful aromatic solvents include aromatic 100 and 150. A preferred aromatic hydrocarbon solvent is mineral spirits.

The amount of hydrocarbon solvent included in the coating composition lower than the amount found in comparable traditional coating compositions in order to decrease the amount of VOCs present in the coating composition. In some embodiments, the coating composition includes from 5 to 30% by weight of hydrocarbon solvent. In other embodiments, the coating composition include 5 to 25% by weight of the hydrocarbon solvent, 5 to 20% by weight of the hydrocarbon solvent, or 5 to 15% by weight of the hydrocarbon solvent. In some embodiments, the coating composition includes from 10 to 20% by weight of the hydrocarbon solvent.

The coating composition may also include a reactive or non-reactive diluent. The reactive or non-reactive diluent improves the ability of the coating composition to penetrate a surface, such as a wood surface. Examples of reactive or non-reactive diluents include oils or their derivatives and may include drying oils and semi drying oils such as poppy seed oil, soya oil, dehydrated castor oil, linseed oil, perilla oil, cottonseed oil, tall oil, safflower oil, fish oil, walnut oil, and Tung oil, and/or non-drying oils such as coconut oil, castor oil, palm oil and peanut oil, mineral oil, and cutting board oil. Other oils or their derivatives that can be used as reactive or non-reactive diluents include corn oil, rapeseed oil, low eruric rapeseed oil, hempseed oil, kapok oil, wild mustard, oiticica oil, olive oil, poppyseed oil, tobaccoseed oil, argentine rapeseed oil, rubberseed oil, safflower oil, sesame oil, soybean oil, sugarcane oil, sunflower oil, teaseed oil, black walnut oil, Babassu oil, Chinese Tallow oil, Ouri-Curl oil, Palm Kernel oil, TungSolv 2000, Sunpol 7103 from Tung oil, Sunpol 7210 from Soya, the Dililin from linseed oil, Cardolite Ultra LITE 513 and NX-2026 from cashew nutshell liquid, Castung 103 G-H, Castung 403 U-V from Castor oil, and the like or mixtures thereof (i.e. methyl esters thereof). In some embodiments, the reactive or non-reactive diluent comprises linseed oil, while in additional embodiments the reactive or non-reactive diluent comprises Tung oil. In one embodiment, the diluent is a reactive oil and has an iodine content of greater than 130, and in other embodiments, greater than 150. In another embodiment, the diluent is non-reactive and have a viscosity of less than about 60 cSt at 40° C. And, in another embodiment, the viscosity of the non-reactive diluent is about 12 to about 30 cSt at 40° C.

The coating composition can include a variety of different amounts of the reactive or non-reactive diluent. In some embodiments, from 0 to 25% by weight of the coating composition comprises a reactive or non-reactive diluent. In further embodiments, from 0 to 20% by weight of the coating composition comprises a reactive or non-reactive diluent. In additional embodiments, from 0 to 10% by weight, from 0 to 5% by weight of the composition comprises the reactive or non-reactive diluent.

The coating composition also includes driers and drier catalysts, such as drier metals like those based on cobalt, manganese, zirconium, zinc, iron-complex, and calcium. Combinations of drier and drier catalysts are commercially available as drier packages. In some embodiments, the drier composition comprises a calcium drier and a zirconium drier. Typically, only a small amount of drier is necessary. In some embodiments, from 0.1 to 3% by weight of the composition comprises the drier composition (i.e. drier and optionally the drier catalyst), while in other embodiments from 0.1 to 1.5% or from 0.5 to 1.5% of the composition comprises the drier composition.

The coating composition may also include drier accelerators, such as Dri-Rx HF. Typically, only a small amount of the drier accelerator is necessary. In some embodiments, from 0.1 to 1% by weight of the composition comprises the drier accelerator composition, while in other embodiments from 0.1 to 0.5% or from 0.1 to 0.2% of the composition comprises the drier accelerator composition.

The coating composition may also include anti-skinning agent, such as methyl ethyl ketoxime (MEKO), N, N-Diethylhydroxylamine, 2-pentanone oxime, cyclohexanone oxime, or combinations thereof. In some embodiments, from 0.1 to 1.0% by weight of the composition comprises the anti-skinning composition, while in other embodiments from 0.1 to 0.5% by weight of the of the composition comprises the anti-skinning composition.

The coating composition can be modified with other standard ingredients commonly used to formulate coatings, penetrating stains, wood preservatives and water sealants. For example, the dispersions of this invention can be combined with other ingredients such as paraffins, waxes, UV absorbers, rheology modifiers, mildewcides, biocides, fungicides, antioxidants, catalysts, wetting agents, dispersing agents, flow modifiers, adhesion promoters, extenders, and other conventional additives such as rheological additives, inert pigments, and anti-settling agents. Paraffin wax and UV absorber are typically included in coatings intended for outdoor application such as siding stains and deck stains, but can also be included in other coatings such as furniture stains and floor stains. In some embodiments, the coating composition includes a fungicide and a UV absorber. Ultraviolet light absorbers (i.e., UV stabilizers) include benzophenones, triazoles, triazines, benzoates, substituted benzenes, organophosphorous sulfides, etc. These additives may be included in conventional amounts.

The coating composition also includes a hyper-branched (e.g., dendritic) alkylated polymer. The hyper-branched polymer is constructed of a molecular structure that frequently repeats regular branching, and has a large number of end groups due to the special branched structure. Compared with a linear or regularly branched polymer, a hyper-branched polymer has characteristics such as loose molecular packing, larger free volume, and less molecular chain tangling.

Hyper-branched alkylated polymers are commercially available. For example, hyper-branched alkylated polymers are available from Perstorp®, Malmo, Sweden. The hyper-branched alkylated polymer can be obtained by reacting one or more fatty acid with a hyper-branched polyol. The hyper-branched polyol can be formed by reacting a high functional polyalcohol such as pentaerythritol or di-pentaerythritol to provide a hyper-branched polyol. In some embodiments, the hyper-branched polyol comprises a polyester. The hyper-branched polyol is then reacted with one or more fatty acid (e.g., tall oil fatty acid) to provide an alkylated hyper-branched polymer. The hyper-branched alkylated polymers may then undergo additional chain extension or other post formation modifications, resulting in higher molecular weight polymers or polymers with varying levels of unsaturation of the fatty acid component.

It should be noted that the molecular weight of the hyperbranched alkylated polymers cannot be directly compared to other alkyd resins as the difference in chain morphology makes interrogation by gel permeation chromatography difficult. In the synthesis of the hyper-branched alkylated polymer, stoichiometric equivalent amounts of acid to hydroxyl groups are charged to the reactor and conversion is measured by the reduction in acid number of the material. A reduction in acid number signifying the successful esterification reaction of the fatty acid. In experimental samples, acid numbers of the resulting hyper-branched alkylated polymers were less than 10 mg KOH/g and frequently less than 6 mg KOH/g. In some instances, the acid number is less than 4 mg KOH/g.

By using a blend of fatty acids, or changing the specific fatty acid use, to form the hyper-branched alkylated polymers, the user is able to alter performance characteristics such as dry time, hardness development, tackiness, and viscosity. For example, alkyd resins derived from high conjugated fatty acids (around 40%), i.e. 9-11 acid groups and Pamolyn 300, produced compositions with faster dry times and better tackiness than those derived from low conjugated fatty acid (around 11%) i.e. Pamolyn 200. The alkyd resin derived from a castor oil based fatty acid has been shown to achieve better tackiness than compositions derived from tall oil-based fatty acid blends.

In one embodiment, the viscosity of the hyper-branched alkylated polymer has a viscosity of less than about 1500 cps, in another embodiment, less than about 1000 cps, in another embodiment, less than about 750 cps, in another embodiment less than about 500 cps, and in yet another embodiment, less than about 300 cps.

For a more detailed description of the preparation of alkylated hyper-branched polymers, see for example Sorensen, K, "Routes to VOC-compliant alkyd coatings," Surface Coatings International, Issue 2008/6, p. 312-318; Wang et al., "Making alkyd greener: Modified cardanol as bio-based reactive diluents for alkyd coating," Progress in Organic Coatins, 135 (2019), 281-290; Shaik et al., "Synthesis and characterization of castor-oil-based branched polyols from renewable resources and their polyurethaneurea coatings," J. Coat. Technol. Res., 16(2), 387-400 (2019); and Murillo et al., Colloidal, morphological, thermal, rheological, and film properties of waterborne hyperbranched alkyd-acrylic resins," J. Coat. Technol. Res., 16(5), 1223-1232 (2019). The disclosures of these references are incorporated herein in their entirety by reference.

The coating composition can include a variety of different amounts of hyper-branched alkylated polymers. In some embodiments, from 15 to 95% by weight of the composition comprises the hyper-branched alkylated polymer, while in additional embodiments from 20 to 80% by weight, from 25% to 40% by weight, or from 25 to 35% by weight of the composition comprises the hyper-branched alkylated polymer.

Methods for Coating a Surface

Another aspect of the invention provides a method for coating a surface. The method includes applying a low volatile organic compound (VOC) coating composition to the surface and removing any excess of the coating composition from the surface. The low VOC coating composition comprises a hydrocarbon solvent; a reactive or non-reactive diluent; a drier; and a hyper-branched alkylated polymer, as described herein. The coating can be applied to a variety of substrates by conventional application methods such a spraying, dipping, brushing, or flow coating. Substrates that can be coated with the composition are, for example, metal, wood, glass, or plastics such as polypropylene, polystyrene, composites and the like. Preferably, the method provides a surface coating or a reactive or non-reactive finish for a porous substrate such as wood, concrete, cement, brick and the like.

The coating composition used in the method can include any of the features of the coating composition described herein. For example, in some embodiments, 25% to 95% by weight of the low VOC coating composition used in the method comprises hyper-branched alkylated polymer.

In some embodiments the composition is a wood stain and the method is used to stain a wood surface. A stain composition includes a dispersed colorant. Wood, such as furniture for example, is commonly stained to achieve a new tone or color while preserving the natural wood appearance. The wood can be stained by applying a stain product onto a wood surface. Staining can be achieved by applying a solution including a stain to a wood surface using a brush or cloth.

When applying to wood, it is preferable to apply a liberal amount of the stain coating composition, then wipe it all off immediately while it is still wet. The wood will absorb what it can, and then everything that was not absorbed can be wiped off. When wiping off the excess stain, this avoids leaving too much of some stains atop the wood which can cause finishes to delaminate, turn hazy, or chip off easily, and ensures that the stain dries in a reasonable amount of time.

The present invention is illustrated by the following example. It is to be understood that the particular example, materials, amounts, and procedures are to be interpreted broadly in accordance with the scope and spirit of the invention as set forth herein.

EXAMPLE

Example 1: Solventborne Stain Formulas

Two different staining compositions were prepared. One of the staining compositions had a VOC of 100, while the other staining composition had a VOC of 130, both in grams per liter. The compositions provided coatings with good viscosity and gloss. Ranges encompassing other suitable stain formulas are also provided in Table 1.

TABLE 1

| 100 and 135 VOC stain formulas | | | |
|---|---|---|---|
| Description | 100 VOC Formulation % wt | 135 VOC Formulation % wt | Reasonable Range % wt |
| MINERAL SPIRITS | 8.77 | 12.77 | 5-15 |
| MINERAL OIL | 5.0 | 5.0 | 0-10 |
| Suspention agent (e.g. SUSPENO 201-MS) | 1 | 1 | 0.25-2 |
| PARAFFIN WAX | 1.6 | 1.6 | 1-2 |
| Hyperbranched Alkyd | 74.24 | 65.35 | 25-95 |
| LINSEED OIL | 0 | 2.5 | 0-5 |
| RAW TUNG OIL | 2.5 | 5 | 0-10 |
| UV Absorber (e.g. TINUVIN 5050) | 0.85 | 0.85 | 0.5-1.5 |
| Fungicide (e.g. FUNGITROL 11E) | 0.75 | 0.75 | 0.25-0.75 |
| Fungicide (e.g. POLYPHASE 2085) | 1.45 | 1.45 | 0.5-2.3 |
| BLACK Colorant | 0.01 | 0.01 | 0-0.1 |
| RED Colorant | 0.066 | 0.066 | 0-1 |
| YELLOW Colorant | 1.4 | 1.4 | 0-2.5 |
| 10% CALCIUM CEM-ALL | 0.738 | 0.65 | 0.1-1.5 |
| 24% ZIRCONIUM DRIER | 0.665 | 0.585 | 0.1-1.0 |
| 12% MANGANESE CEM-ALL | 0.221 | 0.195 | 0.05-0.3 |
| 12% COBALT CARBOXYLATE | 0.221 | 0.195 | 0.05-0.3 |
| Ascinin Anti skin 0445 | 0.4 | 0.4 | 0.1-0.6 |
| Properties | | | |
| Calculated VOC | 97.0 | 133.0 | |
| Weight per Gallon | 7.96 | 7.87 | |
| Formula Code | 005 | 004 | |

The complete disclosure of all patents, patent applications, and publications, and electronically available materials cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:
1. A coating composition, comprising:
    at least one hyper-branched alkylated polymer, wherein the hyper-branched alkylated polymer is derived from a fatty acid or a blend of fatty acids with a conjugated content of greater than about 11%;
    a drier accelerator; and
    an anti-skinning agent;

wherein the coating composition has a viscosity of less than about 1500 cps and a volatile organic compound (VOC) content of less than about 250 g/L.

2. The coating composition of claim 1, wherein the coating composition further comprises a hydrocarbon solvent, or mixtures thereof.

3. The coating composition of claim 1, wherein the coating composition further comprises a reactive or non-reactive diluent.

4. The coating composition of claim 1, wherein the composition has a volatile organic compound content of less than about 150 g/L.

5. The coating composition of claim 1, wherein the composition includes a dispersed colorant.

6. The coating composition of claim 5, wherein the colorant is a pigment.

7. The coating composition of claim 4, wherein the coating composition is a wood stain.

8. The coating composition of claim 1, wherein 25% to 95% by weight of the composition is the hyper-branched alkylated polymer.

9. The coating composition of claim 1, wherein the conjugated content is greater than about 36%.

10. The coating composition of claim 1, wherein the hyper-branched alkylated polymer has a viscosity that is less than about 1500 cps.

11. The coating composition of claim 10, wherein the hyper-branched alkylated polymer has a viscosity that is less than about 1000 cps.

12. The coating composition of claim 11, wherein the hyper-branched alkylated polymer has a viscosity that is less than about 750 cps.

13. The coating composition of claim 3, wherein the diluent is a reactive diluent with an iodine value of greater than about 130.

14. The coating composition of claim 13, wherein the iodine value is greater than about 150.

15. The coating composition of claim 3, wherein the diluent is a non-reactive diluent with a viscosity of about 12 cSt to about 30 cSt@, 40° C.

16. The coating composition of claim 2, wherein 5 to 20% by weight of the composition is the hydrocarbon solvent.

17. The coating composition of claim 2, wherein the hydrocarbon solvent comprises mineral spirits.

18. The coating composition of claim 3, wherein 10 to 25% by weight of the composition is the reactive or non-reactive diluent.

19. The coating composition of claim 3, wherein the reactive or non-reactive diluent comprises linseed oil, tung oil, or combinations thereof.

20. The coating composition of claim 1, wherein 0.1 to 3.5% by weight of the composition is a drier composition comprising a metal drier and optionally, a drier catalyst.

21. The coating composition of claim 1, wherein the drier composition comprises a calcium drier and a zirconium drier.

22. The coating composition of claim 1, wherein the coating composition further comprises a fungicide and a UV absorber.

23. The coating composition of claim 1, wherein the hyper-branched alkylated polymer is obtained by reacting at least one fatty acid with a hyper-branched polyol.

24. The coating composition of claim 23, wherein the hyper-branched polyol comprises a polyester structural unit.

25. A method for coating a surface, comprising applying a low volatile organic compound coating composition having a viscosity of less than about 1500 cps and a volatile organic compound (VOC) content of less than 250 g/L to the surface and removing any excess of the coating composition from the surface, wherein the coating composition comprises an anti-skinning agent; a drier accelerator; and a hyper-branched alkylated polymer, wherein the hyper-branched alkylated polymer is derived from a fatty acid or a blend of fatty acids with a conjugated content of greater than about 11%.

26. The method of claim 25, wherein the coating composition further comprises a diluent.

27. The method of claim 25, wherein the coating composition is a wood stain, and the surface is a wood surface.

28. The method of claim 25, wherein 25% to 95% by weight of the coating composition is one or more hyper-branched alkylated polymers.

* * * * *